(12) United States Patent
Forrester

(10) Patent No.: US 6,865,376 B2
(45) Date of Patent: Mar. 8, 2005

(54) SYSTEM AND METHOD FOR A GPS ENABLED ANTENNA

(75) Inventor: Timothy David Forrester, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 428 days.

(21) Appl. No.: 09/898,269

(22) Filed: Jul. 3, 2001

(65) Prior Publication Data

US 2003/0008660 A1 Jan. 9, 2003

(51) Int. Cl.[7] ................................................. H04B 1/38
(52) U.S. Cl. .................... 455/73; 455/456.1; 455/11.1; 455/13.3; 455/78; 342/357.1; 343/702; 343/876; 333/129; 333/132
(58) Field of Search ................................ 455/73, 456.1, 455/553.1, 78, 83, 11.1, 13.3, 456.6; 343/702, 876, 858, 860; 333/132, 129, 101, 134; 342/357.1

(56) References Cited

U.S. PATENT DOCUMENTS

| 6,097,974 | A | * | 8/2000 | Camp et al. | ............. | 455/575.7 |
|---|---|---|---|---|---|---|
| 6,317,608 | B1 | * | 11/2001 | Glocker | .................... | 455/553.1 |
| 6,553,210 | B1 | * | 4/2003 | Lindemann et al. | .......... | 455/82 |
| 6,600,385 | B2 | * | 7/2003 | Harada et al. | .............. | 333/101 |
| 6,667,723 | B2 | * | 12/2003 | Forrester | .................... | 343/858 |
| 2002/0101907 | A1 | * | 8/2002 | Dent et al. | .................. | 375/132 |
| 2002/0107033 | A1 | * | 8/2002 | Kim | ........................... | 455/456 |
| 2002/0123319 | A1 | * | 9/2002 | Peterzell | ..................... | 455/296 |
| 2002/0163391 | A1 | * | 11/2002 | Peterzell | ...................... | 331/25 |
| 2002/0173337 | A1 | * | 11/2002 | Hajimiri et al. | ............ | 455/552 |
| 2002/0183016 | A1 | * | 12/2002 | Kemmochi et al. | .......... | 455/83 |
| 2003/0206076 | A1 | * | 11/2003 | Hashemi et al. | .............. | 333/32 |

* cited by examiner

Primary Examiner—Rafael Perez-Gutierrez
Assistant Examiner—Khawar Iqbal

(57) ABSTRACT

A system and method for providing a global positioning system (GPS) enabled antenna system are provided. The GPS enabled antenna may be used, for example, on a wireless communications device such as a wireless handset. The wireless communications device includes a GPS switching module coupled to a conventional communications antenna, including its associated circuitry. The GPS switching module is adapted to selectively couple the communications antenna to GPS matching circuitry. In this arrangement, the GPS matching circuitry adjusts impedance at approximately 1575 MHz to more closely match the communications antenna to GPS circuitry in the wireless device.

12 Claims, 5 Drawing Sheets

SYSTEM AND METHOD FOR A GPS ENABLED ANTENNA

FIELD OF THE INVENTION

The present invention generally relates to a system and a method for providing a global positioning system (GPS) enabled antenna.

BACKGROUND OF THE INVENTION

A conventional hand-held global positioning system (GPS) device provides positional information about the location of the GPS device by receiving and processing GPS band signals from a GPS system including satellites and base stations. Although such positional information can be quite useful, it is not convenient to carry a conventional GPS device along with a multitude of mobile wireless communications devices such as laptops, mobile phones, PDAs, or other mobile devices on which users now depend. It is therefore desirable that a GPS positioning function be included with another device, such as a wireless mobile handset.

Unfortunately, the integration of GPS technology with other mobile wireless communications devices such as, for example, cellular or personal communications services (PCS) phones has proven difficult. In particular, three alternatives have been identified for adding GPS capability to a wireless device or handset, but have proven unsatisfactory in use.

A first choice is to add GPS capability in a wireless handset by adding a separate antenna for GPS reception. Since the wireless network antenna is not modified, network communications quality is not adversely affected. However, as mobile handsets for wireless networks have become much smaller, less space is available on the handset housing to accommodate a separate, custom-designed GPS antenna. Furthermore, a GPS antenna disposed within the handset housing typically suffers from a number of reception problems. For example, poor reception can be caused by electromagnetic shielding within the handset housing and by the handset housing itself. Adjusting the electromagnetic shielding to accommodate the GPS antenna may cause substantial redesign and testing of the handset. Even the hand of the user of the wireless handset may interfere with the reception by the internal GPS antenna as the user grips the handset housing. Also, adding a separate antenna and its associated circuitry to the wireless handset adds expense and design complexity.

A second choice is to add GPS capability to a wireless handset by forcing the existing network antenna on the wireless handset to adequately receive a GPS band signal. For example, a typical dual-band antenna may be constructed to receive a PCS signal at approximately 1900 MHz and a cellular signal at approximately 800 MHz. It may therefore be possible that the existing dual-band antenna may be able to receive a GPS signal at approximately 1575 MHz. However, the GPS signal is at a non-resonant frequency for the dual-band antenna, so the received GPS signal would be less than optimal resulting in degraded signal transfer. In this regard, known dual-band antenna systems are not able to receive a GPS signal with sufficient strength and quality to implement a robust GPS location functionality on a wireless handset.

A third choice is to add GPS capability to a wireless handset by using a tri-band antenna. A tri-band antenna is constructed to receive the cellular, PCS and GPS frequencies, for example. Although such an antenna enables the GPS signal to be received, due to the limitations of antenna design such an antenna normally compromises either the cellular or PCS performance, or both. Using a tri-band antenna also substantially adds extra cost to the antenna.

Accordingly, there exists a need to add GPS position location capability in a wireless handset in a robust, economical manner. Furthermore, it would be desirable that the GPS position location capability be provided in a convenient, aesthetically pleasing manner.

SUMMARY OF THE INVENTION

The present invention alleviates to a great extent the disadvantages of conventional systems and methods for providing a global positioning system (GPS) enabled antenna in a wireless communications device.

In an exemplary embodiment, the present invention provides a system and a method for providing a GPS enabled antenna for a wireless communications device, such as a wireless handset. The wireless communications device includes a GPS switching module coupled to a conventional communications antenna, including its associated circuitry. The GPS switching module is adapted to selectively couple the communications antenna to GPS matching circuitry. In this arrangement, the GPS matching circuitry adjusts impedance at approximately 1575 MHz to more closely match the communications antenna to GPS circuitry in the wireless device, thus ensuring an optimal transfer of antenna signal energy to the GPS receiver.

In another embodiment, the present invention includes an antenna that receives a combined signal having a communications signal component and a GPS signal component. The combined signal is sent from the antenna to a frequency separator. The frequency separator may be in the form of, for example, a triplexer or a three-way switching module. The frequency separator passes the GPS signal to a GPS module, and passes the communications signal to communications circuitry.

In yet another embodiment, the present invention includes an antenna that receives a combined signal having a communications signal component and a GPS signal component. The combined signal is sent from the antenna to a switching module. The switching module may include a changeover switch to support GPS reception and one other communications band such as the cellular band or the PCS band. The switching module may instead include a three-way switch that can route the antenna signal to the cellular circuitry, the PCS circuitry or the GPS circuitry of the wireless communications device. The communications band circuitry or the GPS circuitry may each include its own band-optimized matching circuitry.

Advantageously, the present invention enables an existing antenna in a wireless communications device to be adapted to robustly receive GPS band signals. Using the existing communications antenna to provide a GPS signal is a cost effective and efficient way to provide GPS position location functionality in a wireless communications device. Furthermore, phone aesthetics are unaffected as no separate GPS antenna is required. Adapting an existing antenna frees up space within the wireless communications device that otherwise might have been reserved for a separate and internal GPS antenna. In addition, since the existing antenna extends from the wireless communications device, the present invention benefits from improved reception of GPS band signals.

These and other features and advantages of the present invention will be appreciated from review of the following detailed description of the present invention, along with the accompanying figures in which like reference numerals refer to like parts throughout.

DETAILED DESCRIPTION OF THE INVENTION

Figure 1:
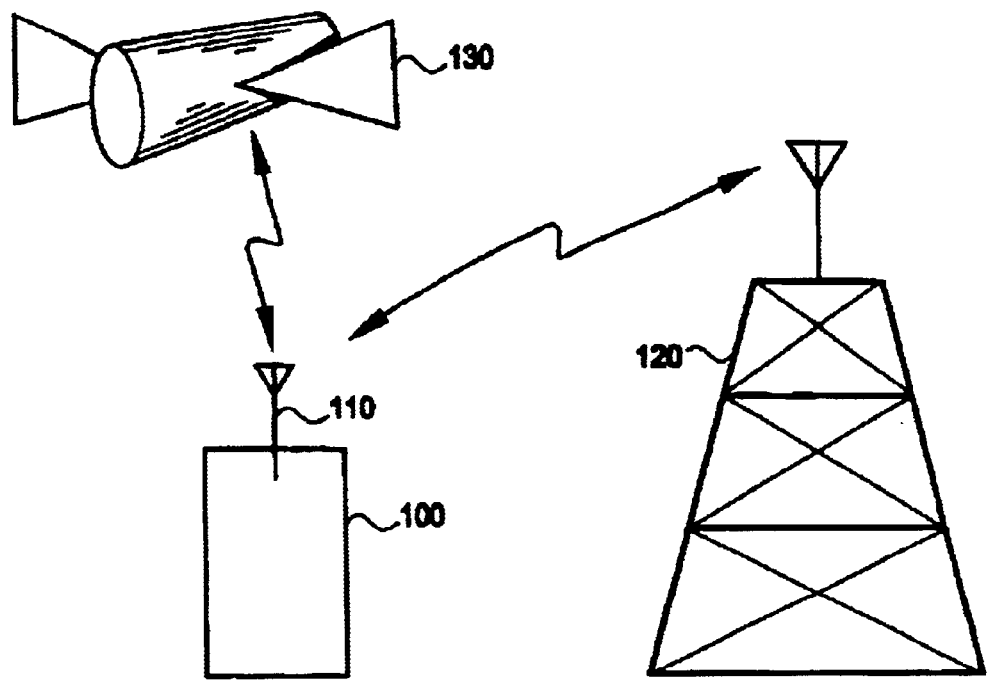
FIG. 1 shows a representation illustrating an exemplary embodiment of a wireless communications system according to the present invention.

FIG. 1 illustrates an exemplary embodiment of a wireless communications system including a wireless communications device 100 according to the present invention. The wireless communications device 100 may include, for example, a handheld wireless communications device, a mobile phone, a car phone, a cellular or a personal communications services (PCS) phone, a cordless phone, a laptop computer or other computing device with a wireless modem, a pager, or a personal digital assistant (PDA). The wireless device 100 may be digital or analog or some combination thereof. Indeed, the present invention contemplates other forms of wireless communications devices known to one of ordinary skill in the art.

The wireless communications device 100 includes an antenna 110. The antenna 110 is structured to transmit and receive wireless communications signals. In FIG. 1, the antenna 110 is in two-way communications with a base station 120. The base station 120 may be, for example, one of a plurality of base stations 120 in a wireless communications network. The antenna 110 is in at least one-way communication with one or more satellites, such as satellite 130. The satellite 130 may be, for example, one of a plurality of satellites such as in, for example, a constellation of global positioning system (GPS) satellites and their ground stations.

In a particular example, the wireless communication device 100 is a wireless handset having the antenna 110 adapted, for example, to receive and transmit wireless communications signals on at least two different communications bands. The two bands may include, for example, the cellular band, a band at approximately 800 MHz, and the PCS band, a band at approximately 1900 MHz. In this exemplary embodiment, the antenna 110 is an existing dual-band antenna constructed to receive and transmit wireless signals on both the PCS and cellular bands. It will be appreciated that more or fewer communication bands may be accommodated by appropriate selection of known antennas and associated circuitry. For example, the wireless device may be constructed to use only the PCS band, or may be constructed to receive and transmit on three or more communication bands. The present invention also contemplates using other wireless communications bands known to one of ordinary skill in the art.

The antenna 110 on wireless communication device 100 is configured to robustly receive position location signals, such as a GPS signal from satellite 130. Advantageously, the antenna 110 may be a known, conventional antenna, such as a standard dual-band antenna. In such a manner, GPS position location functionality may be economically and conveniently added to the wireless communications device.

Figure 2A:
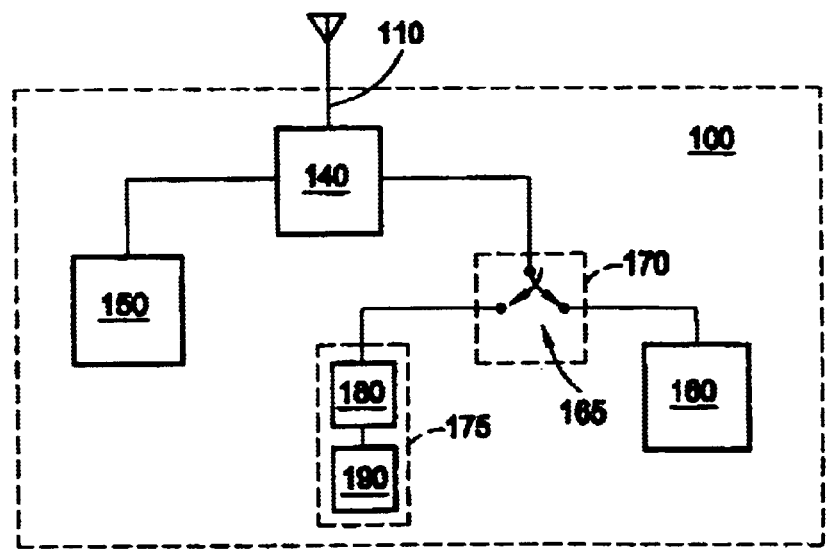
FIG. 2A shows selected components of an exemplary embodiment of the wireless communications device according to the present invention.
Figure 9:
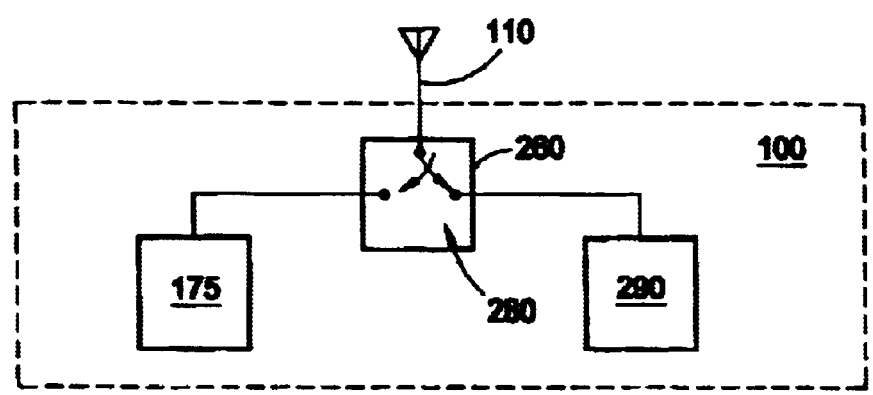
FIG. 9 shows some components of yet another exemplary embodiment of the wireless communications device according to the present invention.

FIG. 2A shows a circuit for robustly receiving a GPS signal using a conventional communications antenna 110. The wireless communications device 100 may include, for example, the antenna 110, a diplexer 140, a first band (e.g., cellular band) duplexer 150, a second band (e.g., PCS band) duplexer 160, a GPS switching module 170 and a GPS module 175. As an alternative to the diplexer 140, a two-way switch (as illustrated in FIG. 9) may be used. As shown in FIG. 2A, the switching module 170 may include, for example, a switch 165. The GPS module 175 may include, for example, an impedance matching module 180 coupled to a GPS low noise amplifier (LNA) 190. It will be appreciated that the circuit illustrated in FIG. 2A is for explanation purposes and that additional well-known circuitry must be added to construct a working communications device.

As illustrated in FIG. 2A, the antenna 110 is coupled to the diplexer 140. The diplexer 140 is coupled to the first band duplexer 150. The diplexer 140 is also coupled to the switching module 170. The switching module 170 is coupled to the second band duplexer 160. The switching module 170 is also coupled to the GPS module 175. In an exemplary embodiment, the switching module 170 is coupled to the impedance matching module 180 which, in turn, is coupled to the GPS LNA 190.

Although not shown, the present invention also contemplates that additional components may be included in the wireless communications device 100. For example, a GPS signal processor may be coupled to the GPS LNA 190. In another example, transmitters and/or receivers may be coupled to the duplexers 150, 160. Such additional components are known to one of ordinary skill in the art and are not described here in further detail.

Figure 3A:
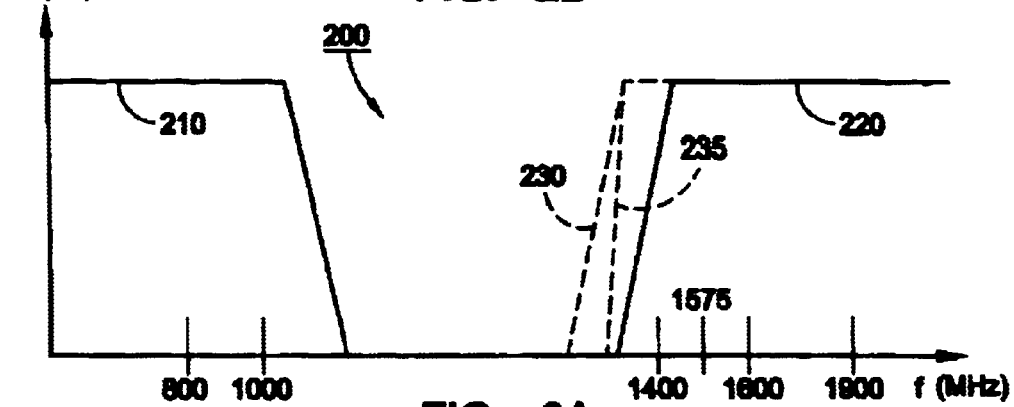
FIG. 3A is a plot of a frequency response according to an exemplary embodiment of the present invention.

A diplexer is typically used to direct communications signals responsive to the particular communications bands being used. For example, the diplexer 140 separates a signal received on the antenna 110 into a PCS path or cellular path. FIG. 3A shows an exemplary composite frequency response 200 for the diplexer 140. The frequency response 200 includes a low pass filter characteristic 210 of a low pass filter and a high pass filter characteristic 220 of a high pass filter of the diplexer 140. The low pass filter characteristic 210 is illustrated with a cutoff frequency of approximately 1000 MHz and is designed to pass the cellular band. The high pass filter characteristic 220 is illustrated with a cutoff frequency of approximately 1600 MHz and is designed to pass the PCS band. It will be appreciated that the cutoff frequencies may be adjusted to accommodate particular applications, and that other cutoff frequencies may be selected for other communication bands. The high pass filter characteristic 220 is designed to pass, with some acceptable level of attenuation, a signal in the GPS band.

In operation, a wireless communications signal from at least one wireless communications band is received by the antenna 110. The diplexer 140 splits the wireless communications signal into at least a first signal and a second signal. The first signal is filtered by the low pass filter of the diplexer 140 and then coupled to the first band duplexer 150. The second signal is filtered by the high pass filter of the diplexer 140 and then coupled to the switching module 170.

In an exemplary embodiment, if the wireless communications signal includes, for example, cellular band communications signals, then the low pass filter passes the cellular band communications signals to the first band duplexer 150. The first band duplexer 150 may then couple the incoming cellular band communications signal to, for example, a cellular receiver (not shown). In addition, the low pass filter blocks higher frequency bands from passing to the first band duplexer 150.

If the wireless communications signal includes, for example, PCS band communications signals, then the high pass filter of the diplexer 140 passes the PCS band communications signals to the second band duplexer 160 via the switching module 170. If the wireless communications signal includes, for example, GPS band signals, then the high pass filter passes, with some small amount of attenuation, the GPS band signals to the GPS module 175 via the switching module 170. In an exemplary embodiment, the attenuation is caused, in part, because the antenna 110 is an existing dual-band antenna that was not originally optimized for the GPS band.

In the GPS module 175, the impedance matching module 180 provides an impedance match that is tuned for the GPS band. The GPS signal is then amplified in the GPS LNA 190 before being processed by conventional GPS circuitry (not shown). The high pass filter also blocks lower frequency bands.

The wireless communications device normally operates with the switching module 170 coupling the diplexer 140 to the duplexer 160. However, at selected times or intervals it may be desirable to obtain position location information. For example, position information may be useful when a user dials an emergency number. The wireless device may also be operating an application, such as a mapping application, where position location is periodically needed. In another example, a user may instruct the wireless device to obtain position location information. It will be appreciated that many applications exist for a wireless communications device in which position location information is useful.

When position location may be needed, the switching module 170 is switched by control circuitry (not shown) to couple the antenna 110 to the GPS module 175. When configured in this manner, a GPS band signal at approximately 1575 MHz will be received by the antenna and transmitted to the GPS module 175. Since the antenna 110 is, for example, a dual-band antenna tuned to receive at approximately 800 MHz and at approximately 1900 MHz, the GPS signal at approximately 1575 MHz is unmatched. Accordingly, matching module 180 includes matching circuitry to more closely match the impedance between the GPS module 175 and the antenna 110. In such a manner, a high quality GPS signal may be robustly received by the GPS LNA 190.

In another exemplary embodiment, the composite frequency response 200 present in the diplexer 140 can be adapted to pass, with less attenuation, the GPS band. Thus, the high pass filter characteristic 220 can be modified by shifting the cutoff frequency from, for example, approximately 1600 MHz to, for example, approximately 1400 MHz, as illustrated by adapted characteristic 230 in FIG. 3A. The adapted characteristic 230 may also have other differing parameters such as, for example, a different attenuation slope 235. As a result, the GPS band is attenuated even less by the adapted high pass filter characteristic 230 than by the high pass filter characteristic 220. For example, as a result of lowering the cutoff frequency from approximately 1600 MHz (as in a normal cellular/PCS diplexer) to approximately 1400 MHz, the GPS band at approximately 1575 MHz is less attenuated by the diplexer 140 from approximately −1.3 dB to approximately −0.3 dB.

Figure 2B:
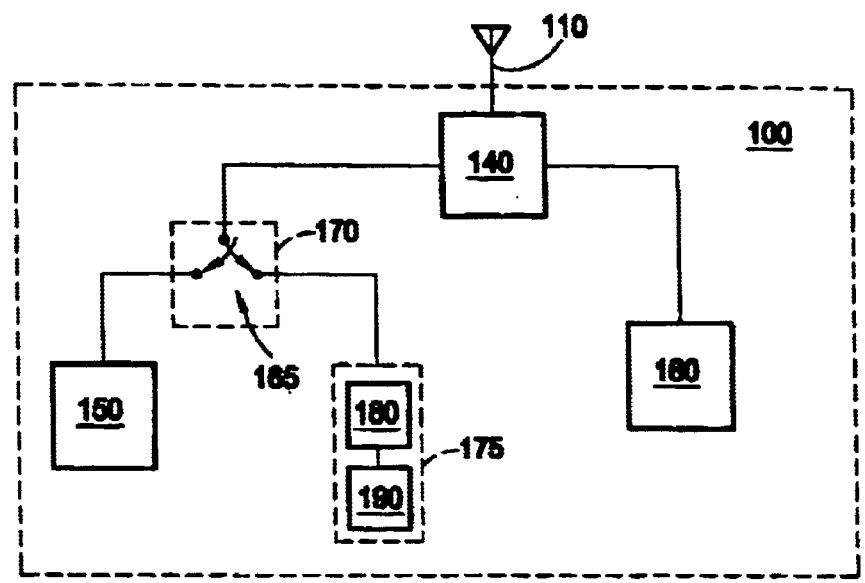
FIG. 2B shows selected components of another exemplary embodiment of the wireless communications device according to the present invention.
Figure 3B:
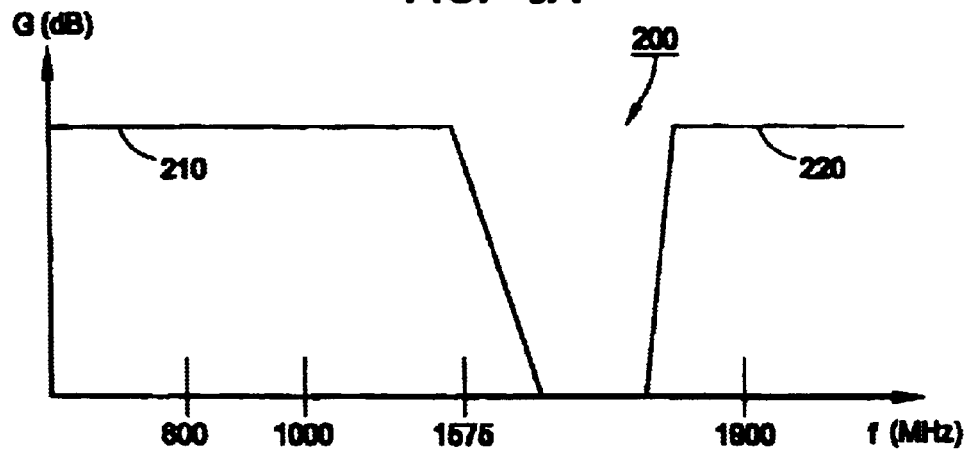
FIG. 3B shows a plot of a frequency response according to another exemplary embodiment of the present invention.

FIG. 2B illustrates another example of a circuit for robustly receiving a GPS signal using a conventional communications antenna 110. The circuit is similar to the circuit illustrated in FIG. 2A, except that the diplexer 140 separates a signal received on the antenna 110 into a PCS path or a cellular/GPS path. Accordingly, the switching module 170 is on the cellular/GPS path. Another example of the frequency response 220 of the diplexer 140 is illustrated in FIG. 3B. In this example, the low pass filter characteristic 210 of the low pass filter of the diplexer 140 extends to higher frequencies to include the GPS band at approximately 1575 MHz. Accordingly, the low pass filter of the diplexer 140 passes the GPS band signals or passes the GPS band signals with a small amount of attenuation to the cellular/GPS path.

Figure 4:
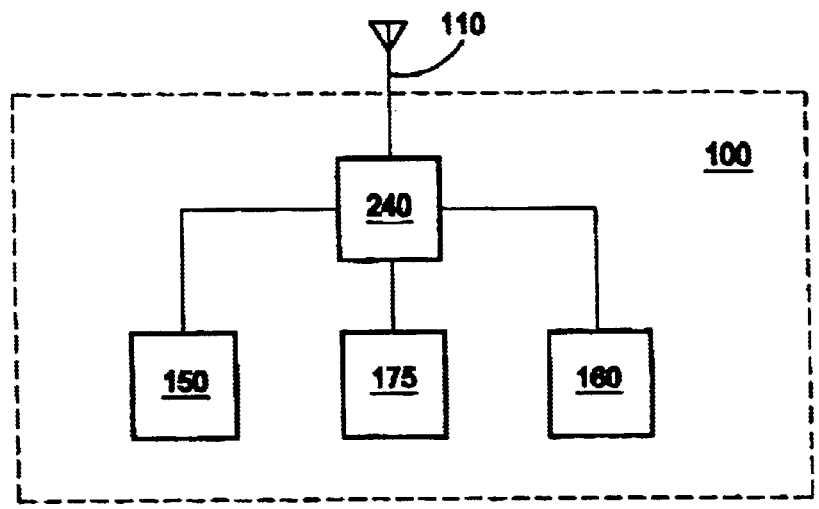
FIG. 4 shows some components of another exemplary embodiment of the wireless communications device according to the present invention.

FIG. 4 shows selected components of another exemplary embodiment of the wireless communications device 100 according to the present invention. The wireless communications device 100 may include, for example, the antenna 110, the first band duplexer 150, the second band duplexer 160, the GPS module 175 and a triplexer 240. The triplexer 240 couples the antenna 110 to the first band duplexer 150, the second band duplexer 160 and the GPS module 175.

Figure 5:
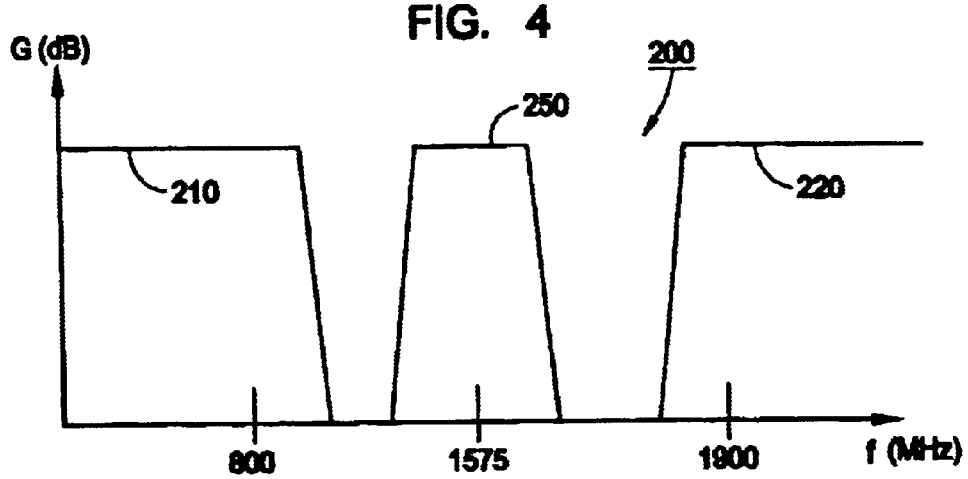
FIG. 5 is a plot of a frequency response according to another exemplary embodiment of the present invention.

An exemplary frequency response 200 for the triplexer 240 is illustrated in FIG. 5 including a low pass filter characteristic 210 of a low pass filter, a high pass filter characteristic 220 of a high pass filter and a band pass filter characteristic 250 of a band pass filter of the triplexer 240. The low pass filter characteristic 210 is illustrated with a cutoff frequency of, for example, approximately 1000 MHz and is designed to pass, for example, the cellular band. The high pass filter characteristic 220 is illustrated with a cutoff frequency of, for example, approximately 1600 MHz and is designed to pass, for example, the PCS band. The band pass filter characteristic 250 is centered, for example, at approximately 1575 MHz and is designed to pass, for example, the GPS band. The characteristics 210, 220, 250 may or may not overlap. The present invention also contemplates using other filter characteristics designed for these and other wireless communications bands.

In operation, a wireless communications signal from at least one wireless communications band is received by the antenna 110. The triplexer 240 splits the wireless communications signal into at least a first signal, a second signal and a third signal. The first signal is filtered by the low pass filter of the triplexer 240 and then coupled to the first band duplexer 150. The second signal is filtered by the high pass filter of the triplexer 240 and then coupled to the second band duplexer 160. The third signal is filtered by the band pass filter of the triplexer 240 and then coupled to the GPS module 175. This coupling mechanism may also include the impedance transformation for optimum performance.

In an exemplary embodiment, if the wireless communications signal includes, for example, cellular band communications signals, then the low pass filter of the triplexer 240 passes the cellular band communications signals to the first band duplexer 150. In addition, the low pass filter blocks higher frequency bands from passing to the first band duplexer 150.

If the wireless communications signal includes, for example, PCS band communications signals, then the high pass filter passes the PCS band communications signals to the second band duplexer 160. In addition, the high pass filter blocks lower frequency bands from passing to the second band duplexer 160.

If the wireless communications signal includes, for example, GPS band signals, then the band pass filter passes the GPS band signals to the GPS module 175. In an exemplary embodiment, in the GPS module 175, the impedance matching module 180 provides an impedance match that is tuned for the GPS band. The GPS signal is then amplified in the GPS LNA 190 before being processed by conventional GPS circuitry. In addition, the band pass filter blocks higher and lower frequency bands from passing to the GPS module 175.

Figure 8:
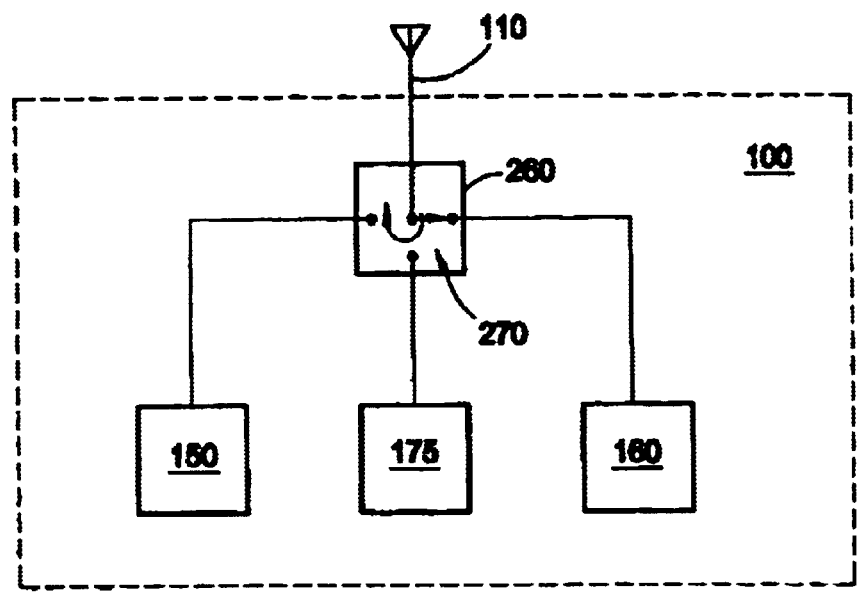
FIG. 8 shows some components of another exemplary embodiment of the wireless communications device according to the present invention.

FIG. 8 illustrates another exemplary embodiment in which a switching module 260 is used instead of the triplexer 240 according to the present invention. The antenna 110 is coupled to the first band duplexer 150, to the second band duplexer 160 and to the GPS module 175 via the switching module 260. The switching module 260 may include, for example, a three-way switch 270. The switching module 260 may be controlled via a main controller (not shown) of the wireless communications device 100 such as, for example, a processor (e.g., a mobile station modem (MSM)). The switching module 260 switches the signal received via the antenna 110. Thus, for example, a cellular band signal may be switched to the first band duplexer 150; a PCS band signal may be switched to the second band duplexer 160; or a GPS signal may be switched to the GPS module 175. The cellular communications circuitry and the PCS communications circuitry may include, for example, band-optimized signal matching circuitry for use with the respective band.

FIG. 9 illustrates yet another exemplary embodiment of the wireless communications device 100 according to the present invention. In this exemplary embodiment, the wireless communications device 100 is configured to receive a GPS signal or a communications band signal (e.g., a cellular band signal or a PCS band signal). The antenna 110 is coupled to the GPS module 175 and to the communications band duplexer 290 via the switching module 260. The switching module 260 may include, for example, a two-way switch 280. The switching module 260 may be controlled via a main controller (not shown) of the wireless communications device 100 such as, for example, a processor (e.g., a mobile station modem (MSM)). The switching module 260 switches the signal received via the antenna 110. Thus, if the wireless communications device 100 is, for example, a cellular phone, then the cellular band signal may be switched to the communications band duplexer 290 or a GPS signal may be switched to the GPS module 175. The communications band circuitry may include, for example, band-optimized signal matching circuitry for use with the communications band.

Figure 6:
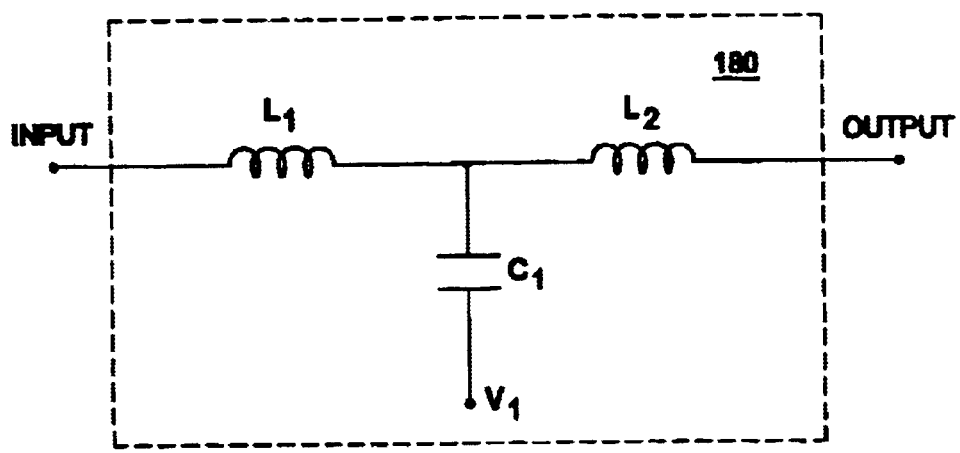
FIG. 6 shows an example of a conventional matching network.

It will be appreciated that matching module 180 or other matching circuitry may be implemented using a wide variety of circuits. FIG. 6 shows one such variant implementing a matching circuit. In FIG. 6, an input to the matching module 180 is coupled to a first inductor $L_1$. The first inductor $L_1$ is coupled to the output of the matching module 180 via a second inductor $L_2$. The first inductor $L_1$ is also coupled to a voltage potential $V_1$ (e.g., electrical or chassis ground) via a capacitor $C_1$. Such matching circuits are well known in the art. The matching module 180 may include other varieties of matching circuits and their dual equivalents. Such matching circuits may also include, for example, passive elements and/or active elements as is known to one of ordinary skill in the art.

Figure 7:
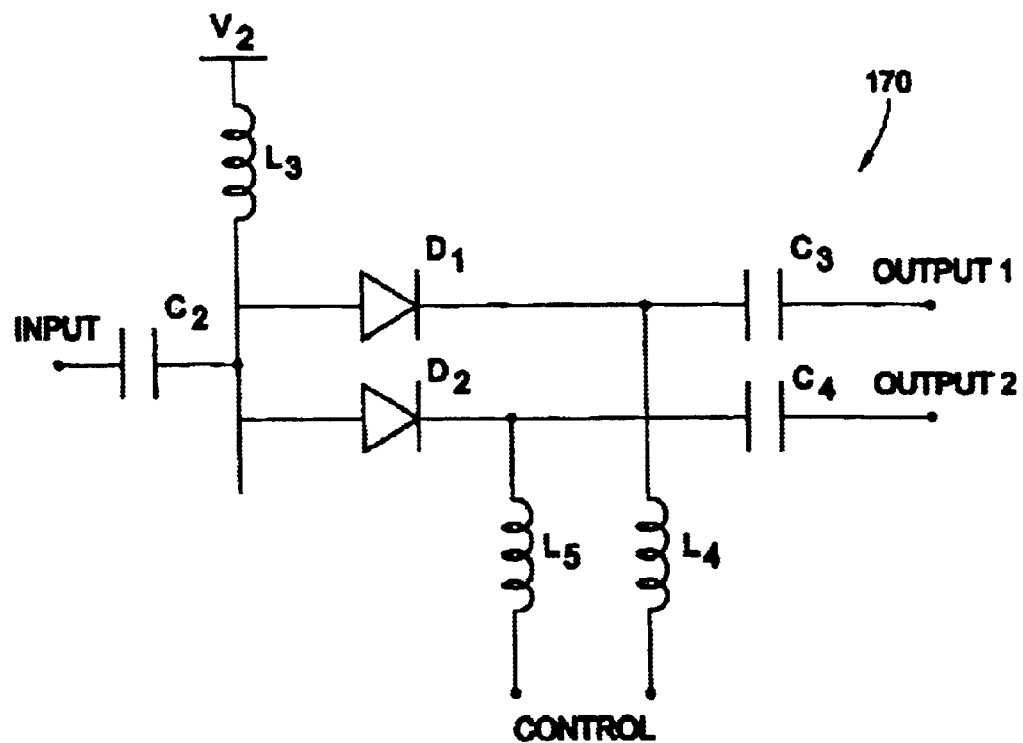
FIG. 7 shows an example of a conventional switching circuit.

It will also be appreciated that switch module 170 may be implemented in several circuit arrangements. FIG. 7 shows one such arrangement of the switching module 170 according to the present invention. An input to the switching module 170 is coupled to a first capacitor $C_2$. The first capacitor $C_2$ is coupled to a voltage potential $V_2$ (e.g., battery supply voltage) via a first inductor $L_3$. The first capacitor $C_2$ is also coupled to two output branches. In a first branch of the circuit, the first capacitor $C_2$ is coupled to a first diode $D_1$. The first diode $D_1$ is coupled to the first output via a second capacitor $C_3$. The first diode $D_1$ is also coupled to a first control signal via a second inductor $L_4$. In a second branch of the circuit, the first capacitor $C_2$ is coupled to a second diode $D_2$. The second diode $D_2$ is coupled to the second output via a third capacitor $C_4$. The second diode $D_2$ is also coupled to a second control signal via a third inductor $L_5$. Briefly, the first control signal and the second control signal provide desired potential differences across the diodes $D_1$, $D_2$ which turn each diode $D_1$, $D_2$ either on or off (i.e., an approximately short circuit or an approximately open circuit). The switching module 170 may implement other variation and examples of switching circuitry known to one of ordinary skill in the art.

Thus, it is seen that a system and method for providing a GPS enabled antenna are provided. One skilled in the art will appreciate that the present invention can be practiced by other than the preferred embodiments which are presented in this description for purposes of illustration and not of limitation, and the present invention is limited only by the claims that follow. It is noted that equivalents for the particular embodiments discussed in this description may practice the present invention as well.

What is claimed is:

1. A system for providing a GPS enabled antenna, comprising:
   a dual band antenna;
   a diplexer coupled to the antenna;
   a switching module coupled to the diplexer;
   a first communications band duplexer coupled to the switching module;
   a second communications band duplexer coupled to the diplexer;
   a global positioning system (GPS) module coupled to the switching module; and
   an impedance matching circuit in the GPS module constructed to match impedance at approximately a GPS signal frequency,
   wherein the switching module is adapted to selectively couple a signal feed from the antenna to one of the GPS module and the first communications band duplexer.

2. The system according to claim 1, wherein the second band signals are cellular band signals.

3. The system according to claim 1, wherein the second band signals are band signals at approximately 800 MHz.

4. The system according to claim 1, wherein the first band signals are personal communications service (PCS) band signals.

5. The system according to claim 1, wherein the first band signals are band signals at approximately 1900 MHz.

6. The system according to claim 1, wherein the GPS module includes a GPS low noise amplifier.

7. The system according to claim 1, wherein the impedance matching circuit is adapted to provide tuning for the GPS band.

8. The system according to claim 1, wherein the GPS module includes the impedance matching circuit and a GPS low noise amplifier, the impedance matching circuit being coupled to the switching module, and the GPS low noise amplifier being coupled to the impedance matching circuit.

9. The system according to claim 1, wherein the switching module includes a two-way switch.

10. The system according to claim 9, wherein the first communications band duplexer is coupled to a first port of the two-way switch, and wherein the GPS module is coupled to the second port of the two-way switch.

11. The system according to claim 1, wherein an attenuation of the diplexer at a GPS frequency of 1575 MHz is approximately −0.3 dB.

12. The system according to claim 1, wherein the diplexer includes a high pass frequency response with a cutoff frequency at approximately 1400 MHz.

* * * * *